(12) United States Patent
AbiEzzi

(10) Patent No.: US 10,693,923 B2
(45) Date of Patent: Jun. 23, 2020

(54) ESTABLISHING STREAMING SESSIONS DURING REMOTE SESSIONS

(71) Applicant: VMware, Inc., Palo Alto, CA (US)

(72) Inventor: Salim AbiEzzi, Sammamish, WA (US)

(73) Assignee: VMware, Inc., Palo Alto, CA (US)

( * ) Notice: Subject to any disclaimer, the term of this patent is extended or adjusted under 35 U.S.C. 154(b) by 465 days.

(21) Appl. No.: 14/607,602

(22) Filed: Jan. 28, 2015

(65) Prior Publication Data
US 2016/0219084 A1 Jul. 28, 2016

(51) Int. Cl.
H04L 29/06 (2006.01)
H04L 29/08 (2006.01)
G06F 15/16 (2006.01)

(52) U.S. Cl.
CPC ........ *H04L 65/1089* (2013.01); *H04L 65/403* (2013.01); *H04L 65/4084* (2013.01); *H04L 67/2823* (2013.01); *G06F 15/16* (2013.01)

(58) Field of Classification Search
CPC . H04L 65/1086; H04L 67/14; H04L 65/1089; H04L 65/403; H04L 65/4084
See application file for complete search history.

(56) References Cited

U.S. PATENT DOCUMENTS

| | | |
|---|---|---|
| 7,149,776 B1 | 12/2006 | Roy |
| 8,473,958 B2 | 6/2013 | Kamay et al. |
| 8,924,862 B1 | 12/2014 | Luo |
| 8,970,492 B2 | 3/2015 | Butner |
| 9,158,434 B2 | 10/2015 | Beveridge |
| 9,167,020 B2 | 10/2015 | Abdo et al. |
| 9,295,915 B2 | 3/2016 | Bruno, Jr. et al. |
| 9,565,227 B1 | 2/2017 | Helter et al. |
| 9,628,332 B2 | 4/2017 | Bruno, Jr. |

(Continued)

FOREIGN PATENT DOCUMENTS

| | | |
|---|---|---|
| JP | 2005-075314 | 3/2005 |
| JP | 2010-026104 | 2/2010 |

(Continued)

OTHER PUBLICATIONS

U.S. Appl. No. 14/582,623, filed Dec. 24, 2014, Remoting Application User Interfaces, AbiEzzi et al.

(Continued)

*Primary Examiner* — Backhean Tiv
*Assistant Examiner* — Joseph M Cousins
(74) *Attorney, Agent, or Firm* — Fish & Richardson P.C.

(57) ABSTRACT

Systems and techniques are described for remoting application user interfaces. One of the described techniques includes initiating a remote session with a first user device that allows user interfaces generated by an application to be presented on the first user device and user events associated with the presented user interfaces to be provided as input to the application; and during the remote session with the first user device: receiving a request to initiate a multimedia streaming session between the first user device and a different system through the application; establishing the multimedia streaming session with the different system; and providing the streaming session parameters to the first user device for use by the first user device in establishing a connection between the first user device and the different system and streaming multimedia content over the connection.

15 Claims, 3 Drawing Sheets

(56) References Cited

U.S. PATENT DOCUMENTS

| | | |
|---|---|---|
| 2004/0010622 A1 | 1/2004 | O'Neill et al. |
| 2006/0075106 A1 | 4/2006 | Hochmuth et al. |
| 2007/0208808 A1 | 9/2007 | Rust |
| 2009/0112808 A1 | 4/2009 | Howcroft |
| 2009/0235177 A1 | 9/2009 | Saul et al. |
| 2010/0106798 A1* | 4/2010 | Barreto ............ G06F 17/30899 709/217 |
| 2010/0135296 A1* | 6/2010 | Hwang ............... H04L 12/1836 370/390 |
| 2010/0169790 A1 | 7/2010 | Vaughan |
| 2010/0269046 A1 | 10/2010 | Pahlavan |
| 2010/0306642 A1 | 12/2010 | Lowet |
| 2011/0138295 A1 | 6/2011 | Monnchilov |
| 2011/0246891 A1 | 10/2011 | Schubert et al. |
| 2011/0295974 A1* | 12/2011 | Kashef ............... H04L 65/1073 709/217 |
| 2012/0204093 A1 | 8/2012 | Habarakada |
| 2012/0324358 A1 | 12/2012 | Jooste |
| 2013/0086212 A1* | 4/2013 | MacInnis ................ H04L 67/16 709/217 |
| 2013/0097488 A1 | 4/2013 | Coman et al. |
| 2013/0290856 A1 | 10/2013 | Beveridge et al. |
| 2013/0290858 A1 | 10/2013 | Beveridge |
| 2013/0346564 A1* | 12/2013 | Warrick .............. H04L 41/0893 709/219 |
| 2014/0026057 A1 | 1/2014 | Kimpton |
| 2014/0215457 A1 | 7/2014 | Gava |
| 2014/0258872 A1 | 9/2014 | Spracklen |
| 2014/0316990 A1 | 10/2014 | Winston |
| 2014/0325374 A1 | 10/2014 | Dabrowski |
| 2014/0344332 A1* | 11/2014 | Giebler ............... H04L 67/2823 709/203 |
| 2014/0355189 A1 | 12/2014 | Nakano |
| 2015/0062183 A1 | 3/2015 | Hong |
| 2015/0089426 A1 | 3/2015 | Ukai |
| 2015/0134840 A1* | 5/2015 | Thompson ............... H04N 5/76 709/228 |
| 2015/0172760 A1 | 6/2015 | AbiEzzi et al. |
| 2015/0199308 A1 | 7/2015 | Cooper |
| 2016/0249006 A1 | 8/2016 | Park et al. |
| 2017/0185438 A1 | 6/2017 | Thomas et al. |
| 2017/0300966 A1 | 10/2017 | Dereszynski |

FOREIGN PATENT DOCUMENTS

| | | |
|---|---|---|
| JP | 2010-126092 | 6/2010 |
| JP | 5994659 | 9/2016 |
| WO | WO 2013/168368 | 11/2013 |

OTHER PUBLICATIONS

U.S. Appl. No. 15/172,946, filed Jun. 3, 2016, AbiEzzi et al.
U.S. Appl. No. 15/191,927, filed Jun. 24, 2016, AbiEzzi et al.
Write Once, Run Anywhere. Wikipedia, The Free Encyclopedia. Last updated Nov. 20, 2015. Retrieved Apr. 5, 2016. Retrieved from the Internet: URL<https://en.wikipedia.org/wiki/Write_once,_run_anywhere>. 2 pages.
Gear, David Pierce. Surface Book is the Laptop Microsoft Needed Years Ago. WIRED. Published Oct. 6, 2015. Retrieved Feb. 5, 2016. Retrieved from the Internet: URL<http://www.wired.com/2015/10/surface-book-future-of-windows/>. 10 pages.
Massey, Sean P. Horizon View 5.3 Part 13—VMware Blast. The Virtual Horizon. Publication Feb. 25, 2014. Retrieved Feb. 5, 2016. Retrieved from the Internet: URL<https://thevirtualhorizon.com/2014/02/25/horizon-view-5-3-part-13-vmware-blast/>. 9 pages.
Device Driver. Wikipedia, The Free Encyclopedia. Last updated Mar. 29, 2016. Retrieved Apr. 5, 2016. Retrieved from the Internet: URL<https://en.wikipedia.org/wiki/Device_driver>. 7 pages.
International Search Report and Written Opinion in International Application No. PCT/JP2013/002600, dated Jun. 11, 2013, 17 pages (English Translation).

* cited by examiner

ESTABLISHING STREAMING SESSIONS DURING REMOTE SESSIONS

BACKGROUND

This document relates to remoting application user interfaces to user devices.

A user of a user device can interact with an application that is executed on a server remote from the user device using a remote display protocol. The remote display protocol can be used to transfer the display data generated by the application for presentation on the user device and to transfer user events generated at the user device to the application. During execution and based on user input events from the user device, the application can generate updates to the display data, and the remote display protocol can be used to transfer the updated display data to the remote client.

SUMMARY

In general, one aspect of the subject matter described in this document can be embodied in a technique that includes the actions of receiving a first user request to access an application from a first user device; initiating a remote session with the first user device that allows user interfaces generated by the application to be presented on the first user device and user events associated with the presented user interfaces to be provided as input to the application; and during the remote session with the first user device: receiving a request to initiate a multimedia streaming session between the first user device and a different system through the application; establishing the multimedia streaming session with the different system, wherein establishing the multimedia streaming session comprises obtaining session parameters for the multimedia streaming session; and providing the streaming session parameters to the first user device for use by the first user device in establishing a connection between the first user device and the different system and streaming multimedia content over the connection.

Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other aspects can optionally include one or more of the following features. The session parameters can include a network address for the different system and session credentials for the multimedia streaming session. The actions can further include receiving, by the first user device, the session parameters; contacting, by the first user device, the different system using the network address; establishing, by the first user device, the connection with the different system using the session credentials; and streaming, by the first user device, multimedia content over the established connection with the different system. The streaming session credentials can include a session token for session authentication and a session key for session encryption.

The actions can further include maintaining the remote session while the multimedia content is streamed over the connection between the first user device and the different system. The actions can further include monitoring the streaming session between the first user device and the different system. The actions can further include during the remote session with the first user device, receiving a request to switch the multimedia streaming session to a second user device; and providing the streaming session parameters to the second user device. The actions can further include receiving, by the second user device, the session parameters; establishing, by the second user device, a second connection with the different system using the session parameters; and streaming, by the second user device, multimedia content over the second connection with the different system. The actions can further include performing a directory look up to locate the different system in response receiving the request.

Particular embodiments of the subject matter described in this document can be implemented so as to realize one or more of the following advantages. By establishing a streaming connection directly between a user device and a different system during a remote session without requiring the streamed content to pass through the remote application system, the amount of processing to be performed by the remote application system can be reduced and the overall amount of bandwidth used for streaming the content can be reduced. Additionally, by establishing the direct connection, the quality of the streamed content can be improved. Furthermore, users streaming content during a remote session can easily and seamlessly switch to streaming the same content from a different user device. Additionally, the trust relations between a given user's services and user devices can be simplified, thus improving the user experience.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes a remote application system that manages the execution of one or more applications and allows remote users to interact with the applications managed by the remote application system. While a remote user is interacting with an application managed by the remote application system, the remote application system can allow a streaming connection to be established directly between the remote user and a different system without requiring the streamed content to pass through the remote application system.

Figure 1:
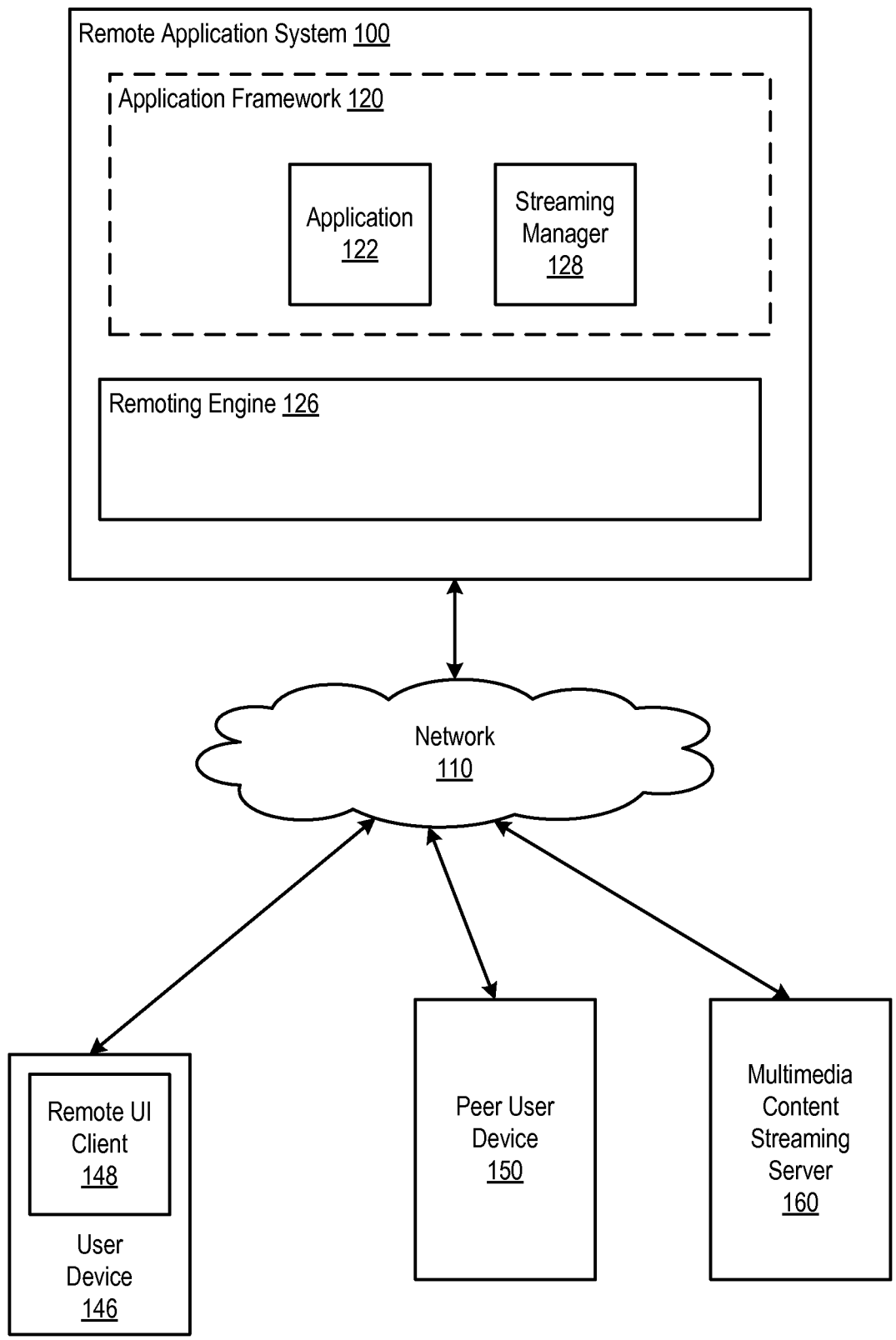
FIG. 1 shows an example remote application system.

FIG. 1 shows an example remote application system 100. The remote application system 100 is an example of a system implemented as computer programs on one or more computers in one or more locations, in which the systems, components, and techniques described below are implemented.

The remote application system 100 manages the execution of one or more applications and allows users of user devices remote from the remote application system 100 to access and interact with the applications managed by the remote application system 100 by providing user interfaces generated by the applications for presentation on the user devices over a network 110. The network 110 can be, e.g., a local area network (LAN), wide area network (WAN), e.g., the Internet, a cellular data network, or a combination thereof.

To allow the users to interact with the application, the remote application system 100 also receives data identifying user events associated with the presented user interfaces and provides those user events as inputs to the applications executing on the remote application system 100. For example, the remote application system 100 can allow a user of a user device 146 to access and interact with an application 122 executing within an application framework 120 on the remote application system 100.

The user device 146 can be any of various user computers that have various display properties and that accept various user input modalities. For example, the user device 146 may be a mobile device, e.g., a smartphone or a tablet computer, a desktop or laptop computer, a network-connected television, and so on.

In some implementations, to account for the different display and input capabilities of different kinds of user devices, the application 122 includes multiple user interface code paths. Each of the user interface code paths, when executed, generates a user interface that is specific to a respective class of user devices. For example, one of the user interface code paths may generate a user interface for user devices that accept touch input, that have displays of specified sizes, and that display output at a specified range of resolutions. As another example, a different one of the user interface code paths may generate a user interface for user devices that accept keyboard and mouse input. As another example, a different one of the user interface code paths may generate a user interface for user devices that accept voice input in addition to touch input. In some other implementations, however, the application 122 includes a single user interface code path that generates the user interface for the application 122.

To allow a user of the user device 146 to interact with an application managed by the remote application system 100, the user device 146 includes a remote user interface client 148 that users of the user device 146 can use to interact with the application 122 or with other applications executing on the remote application system 100. In some implementations, the remote user interface client 148 is a special-purpose process executing on the user device 146. In some other implementations, the remote user interface client 148 is a web browser executing on the user device 146.

In particular, a user of one of the user devices 146 can submit a request to the remote application system 100 through the remote user interface client 148 executing on the user device 146 to access the application 122. A remoting engine 126 in the remote application system 100 receives the request from the remote user interface client 148 to access the application 122 and causes the application 122 to generate a user interface. In implementations where the application 122 includes multiple user interface code paths, the remoting engine 126 classifies the user device 146 into a device class and then causes the application 122 to generate a user interface by executing the user interface code path corresponding to the device class. The remoting engine 126 can classify the user device 146 into a device class based on identifying information for the user device 146 received with the request. For example, the identifying information can include the device type of the user device, e.g., mobile phone, tablet, laptop computer, desktop computer, television, head mounted display and so on, and the input styles accepted by the user device, e.g., touch input, mouse input, keyboard input, infrared (IR) remote, voice input, and so on. As another example, the identifying information can also include information characterizing the display of the user device, e.g., the size of the display, e.g., the x and y dimensions of the display, and the resolution of the display.

The remoting engine 126 then provides the user interface generated by the application 122 to the requesting user device for presentation to the user by the remote user interface client 148 executing on the user device 146. Generally, the remoting engine 126 transmits the user interface data to the remote user interface client 148 executing on the user device 146 using a remote display protocol. In some implementations, the remote display protocol is a pixel-level protocol e.g., the Blast protocol or the remote desktop protocol (RDP), that compresses, encrypts and transports image pixels to the remote user interface client 148 executing on the user device 146. The remote user interface client 148 in turn causes the user device 146 to decrypt, decompress, and display the image pixels. In some other implementations, the remoting engine 126 can provide the user interface data using a higher-level protocol. For example, the higher-level protocol may be a protocol that provides the user interface data using a page layout language with client-side scripting, e.g., a protocol that provides the user interface data in a hypertext markup language (HTML) document with Cascading Style Sheets (CSS) and JavaScript. As another example, the higher-level protocol may be a geometry-based protocol, e.g., a graphics device interface (GDI) protocol.

While the user interface is being displayed to the user, the remote user interface client 148 is configured to detect user events associated with the displayed user interface and provide data identifying the user events to the remoting engine 126. For example, the remote user interface client 148 can detect user events, e.g., a click or touch input on the user interface or a text input or voice command submitted by a user while the user interface is active on the user device, and provide data identifying the user events to the remoting engine 148, e.g., data identifying the location of the user event, the type of the user event, and other user event parameters.

Once the remoting engine 126 receives data identifying a user event, the remoting engine 126 provides the user event as input to the application 122. If the input causes a change to the user interface, the remoting engine 126 receives the updated user interface data from the application 122 and provides the updated user interface data for presentation to the user by the remote user interface client 148, e.g., using the remote display protocol. The continuing exchange of user interface data and data identifying user events between the user device 146 and the remote application system 100 will be referred to in this specification as a "remote session" between the user device 146 and the remote application system 100.

The remote application system 100 may host the application 122 and allow users of the system to interact with the application 122 in any of a variety of ways. For example, the application 122 may be hosted in a virtual machine, on a Remote Desktop Session Host (RDSH) server, or in a container in a web server. As another example, the remote application system 100 may host the application 122 as a software as a service (SaaS) application, i.e., by hosting the application 122 on multiple servers that are fronted by a load balancer, with different instances of the application 122 serving different users.

In some cases, during a remote session with the remote application system 100 and as part of interacting with the application 122, the user may submit a request to initiate a multimedia streaming session with a different system, i.e., a system remote from both remote application system 100 and the user device 146, e.g., over the network 110 or over a different network. For example, if the application 122 is a video conferencing or video chat application, the user may submit a request to initiate a video chat or video conference with a peer user, e.g., a user of a device 150 over the network 110 through the application 122. In some cases, the peer user may also be a user of the remote application system 100. In these cases, the remote application system 100 may handle the streaming of content for the user device 150 in a similar manner as described here for the user device 146. That is, when the streaming session is between two users of the remote application system 100, the streaming is handled by the system using similar techniques for each of the users. As another example, if the application 122 is a music or video streaming application, the system user may submit a user event that identifies a request to stream a piece of audio or video from a multimedia content streaming server 160 over the network 110 through the application 122.

To efficiently establish the multimedia streaming session and allow the user device 146 to effectively stream multimedia content from the different system, the application framework 120 includes a streaming manager 128. The streaming manager 128 receives a request to initiate a streaming session between the user device 146 and a different system, e.g., the peer user device 150 or the multimedia content streaming server 160. Generally, the streaming manager 128 receives the request from the application 122, e.g., in response to the application 122 processing a user event received from the remoting engine 126 and determining that the user event identifies a request to establish the streaming session.

In response to the request, the streaming manager 128 establishes a streaming session with the different system. As part of establishing the streaming session, the streaming manager 128 determines parameters for the streaming session with the different system and provides the streaming session parameters to the remote user interface client 148 on the user device 146. Establishing the streaming session and determining parameters for the session is described in more detail below with reference to FIG. 2. The remote user interface client 148 uses the received streaming session parameters to establish a connection with the different system and then streams the requisite multimedia content using the established connection. Using the parameters to establish a connection with a different system is described below with reference to FIG. 3. In this manner, streamed content that would otherwise need to be routed from the different system and to the remote application system 100 before being delivered to the user device 146 due to being streamed as part of using the application 122 can be streamed directly from the different system by the user device 146, i.e., without requiring the streamed content to pass through the remote application system 100.

Figure 2:
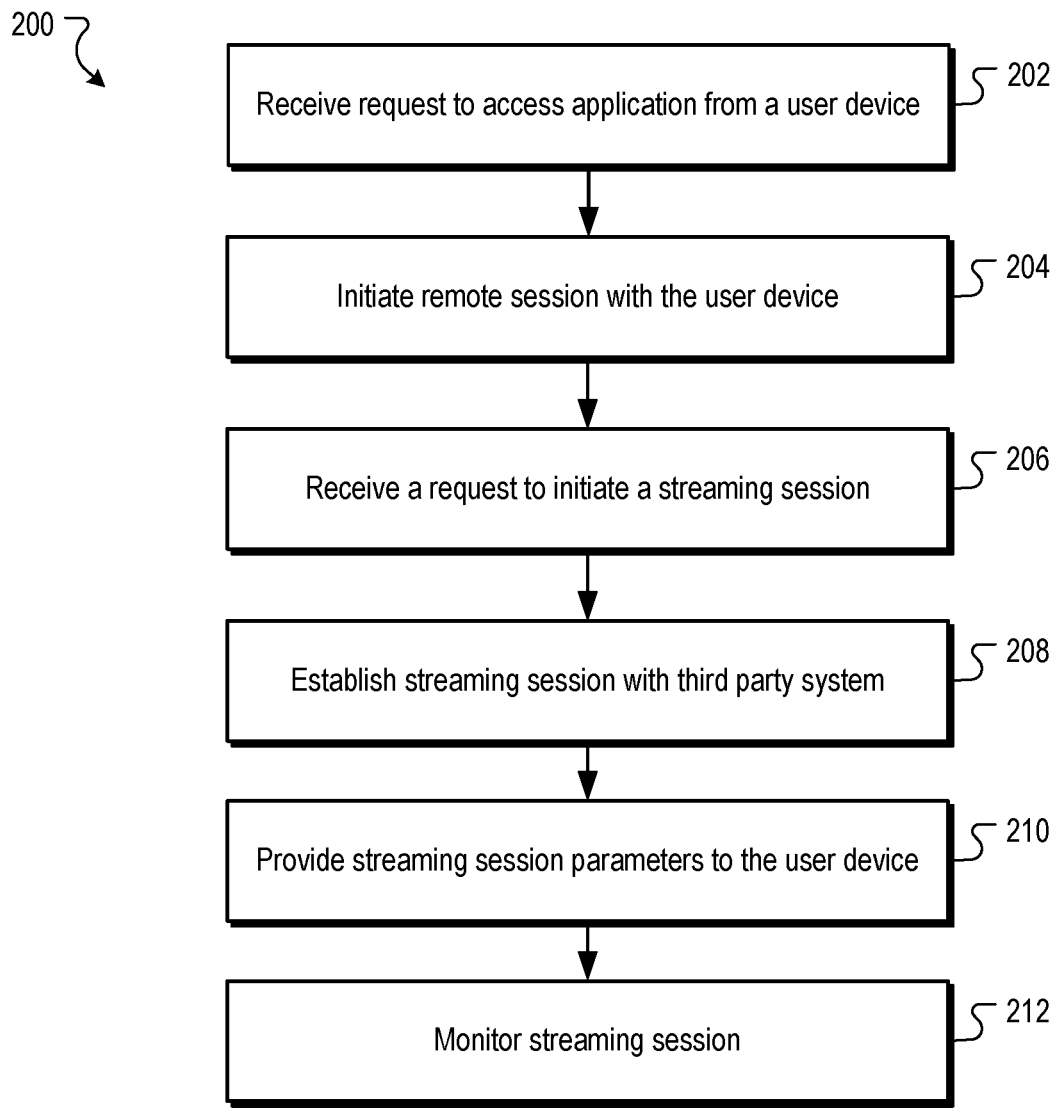
FIG. 2 is a flow chart of an example technique for establishing a streaming session during a remote session.

FIG. 2 is a flow chart of an example technique 200 for establishing a streaming session during a remote session. The example technique 200 is performed by a system of one or more computers. For example, the technique 200 may be performed by a remote application system, e.g., the remote application system 100 of FIG. 1.

The system receives a request to access an application managed by the system from a user device (step 202). For example, the system can receive the request from a user interface client executing on the user device.

The system initiates a remote session with the user device (step 204). During the remote session, the system provides user interface data generated by the application for presentation on the user device and receives from the user device data identifying user events associated with the presented user interface. The system provides the received user events as input to the application and, if the user events cause a change to the current user interface, receives updated user interface data from the application and provides the updated user interface data for presentation on the user device.

During the remote session, the system receives a request to initiate a multimedia streaming session between the user device and a different system through the application (step 206). For example, the user device may be requesting to initiate a video conference, a video call, or a voice over IP (VOIP) audio call with a peer user device. As another example, the user device may be requesting to stream a piece of multimedia content, e.g., a video or an audio file, from a multimedia content service.

The system establishes a streaming session with the different system (step 208). In particular, the system identifies a network address for the different system, e.g., from information included in the request or by looking the network address up in a directory. The system also negotiates credentials for the streaming session with the different system. For example, the session credentials may include a session key for session encryption and a session token for session authorization. Depending on the type of streaming session that is being established, the system may need to provide various authenticating information for the user to obtain the session key and the session token. For example, if the streaming session is a session to stream a piece of video content from a streaming service, the system may need to supply credentials of the user with the service, e.g., a username and password, Digital Rights Management (DRM) information to ensure that the user has rights to view the piece of video content, and so on. If the streaming session is a video conference or video chat with a peer user device, the system may need to perform directory lookup to locate the peer user and provide identifying information for the user to ensure that the user has permission to communicate with a user of the peer user device.

The system provides the streaming session parameters to the user device (step 210) for use in establishing a connection with the different system to stream the requested multimedia content. For example, the system can provide the network address for the different system and the session credentials to a remote user interface client executing on the user device which can in turn cause the user device to contact the different system using the network address and establish the connection with the different system using the session credentials. Establishing a connection using received session parameters is described in more detail below with reference to FIG. 3.

The system continues the remote session and monitors the streaming session between the user device and the different system (step 212). That is, the system continues providing the user interface generated by the application in which the streamed content obtained during the streaming session is presented and monitors the streaming session to determine whether any action on the part of the system is required. For example, the system can monitor the streaming session to log data regarding the length of the session, the content being streamed, and other information characterizing the session. As another example, the system can monitor the streaming session to detect error conditions. For example, the system can monitor the streaming session to determine whether the user device has disconnected from the session, e.g., as a result of losing network connectivity. When the system determines that the user device has been disconnected, the system can pause the streaming session and later resume the session in response to a user request, e.g., a request from a different user device as described below. As another example, the system can monitor the streaming session to determine whether the user would like to switch the session to a different user device. Processing a request to switch the session to a different device is described in more detail below.

As another example, during the session, the system can handle the upper layers of security for the session, e.g., user authentication. For example, the system can handle public-private cryptography and session key exchange, while the device handles the encryption and decryption of the streamed content. For added security, the system can coordinate a new session key during an ongoing stream and at pre-determined intervals.

During the streaming session, the system continues to receive data identifying user events from the user device and to provide those user events as inputs to the application. In some cases, the user events may cause a change to the streaming session, e.g., user inputs requesting to pause, fast forward, or rewind a video being streamed by the user device. In these cases, the system can receive from the application a request to make the modification and transmit data to the other system identifying the request. The system may also receive user interface updates from the application during the streaming session and provide those user interface updates to the user device. For example, during a multi-user conference, the system can receive a list of attendees of the conference or text messages sent by the attendees from the application and provide this information for presentation on the user device.

In some cases, the different system may be capable of calibrating the generated stream so that the stream is specific to particular user device classes. In these cases, either the system or the user device can provide identifying information for the user device to the different system before the stream is initiated to allow the different system to calibrate the generated stream accordingly. For example, the system may provide the identifying information for the user device to the different system when establishing the streaming session with the different system or the user device can provide the identifying information to the different system when establishing the connection with the different system using the parameters received from the system.

Figure 3:
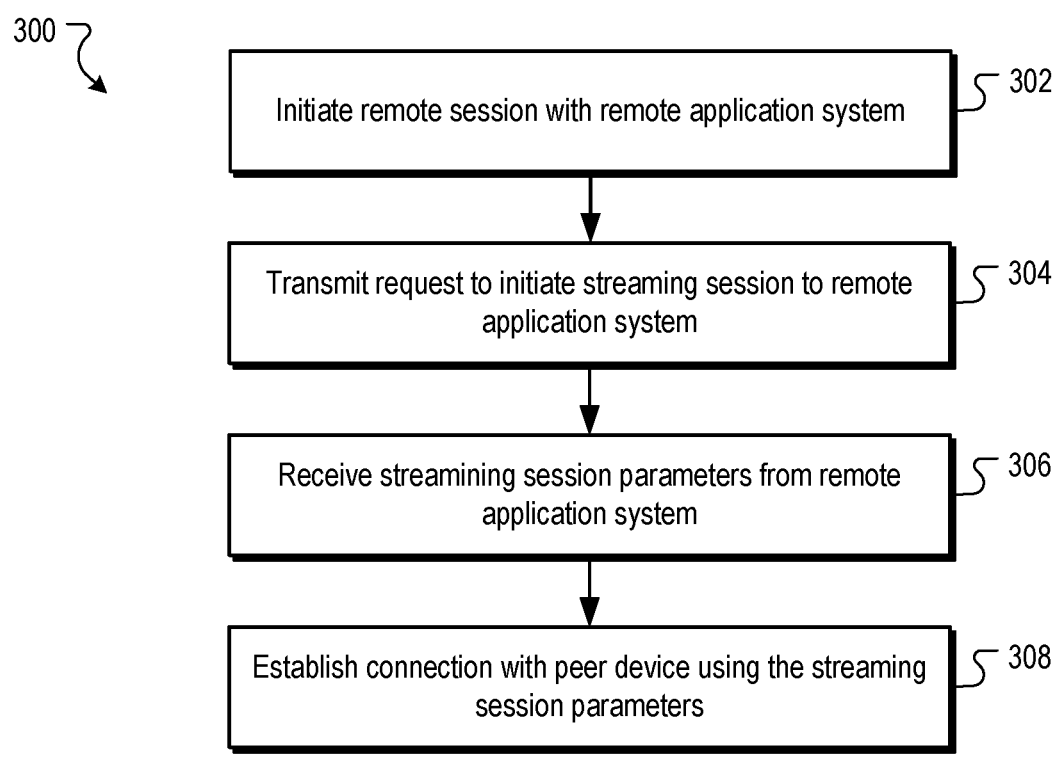
FIG. 3 is a flow chart of an example technique for establishing a connection between a user device and a different system for streaming content during a remote session.

FIG. 3 is a flow diagram of an example process 300 for establishing a connection between a user device and a different system. The example technique 300 is performed by a user device, e.g., the user device 146 of FIG. 1, that is in communication with a remote application system, e.g., the remote application system 100 of FIG. 1.

The user device initiates a remote session with a remote application system that allows a user of the user device to interact with an application managed by the remote application system (step 302). In particular, during the remote session, the remote application system provides user interface data generated by the application for presentation on the user device while the user device provides data identifying user events detected by the user device that are associated with the presented user interface to the remote application system.

During the remote session, the user device transmits to the remote application system data identifying a user event that is indicative of a request to initiate a multimedia streaming session with a different system through the application managed by the remote application system (step 304). For example, the system may detect a user input requesting to initiate a multimedia streaming session with the different system and can provide a user event identifying the event to the remote application system.

The user device receives session parameters for the streaming session from the remote application system (step 306). Generally, the received session parameters include a network address for the different system and credentials for the streaming session that the remote application system has negotiated with the different system, e.g., a session token and a session key.

The user device uses the session parameters to establish a connection with the different system (step 308). That is, the user device contacts the different system using the network address identified in the session parameters and then establishes the connection using the session credentials. For example, the user device can provide the session token to the different system and encrypt data sent during the session using the session key. The different system can use the session token to accept a connection from the user device and the session key to decrypt and encrypt communication with the user device during the session.

The user device streams multimedia content over the established connection from the different system (step 310). In some cases, the multimedia content flows only to the user device over the connection during the streaming session, e.g., when the streaming session is a session to stream a piece of video or audio content from a streaming service. In some other cases, multimedia content flows both to and from the user device during the streaming session, e.g., if the streaming session is a voice call or a video conference between the user device and a peer user device.

During the streaming session, the user device maintains the remote session with the remote application system. That is, while the multimedia content is being streamed over the established connection, the user device continues to detect user events associated with the displayed user interface and provide the detected user events to the remote application system. The user device may also continue to receive and present user interface updates from the remote application system during the streaming session. For example, the user interface may include a designated portion where the user device displays the streamed content, with the remainder of the user interface being displayed and updated based on user interface updates received from the remote application system.

In some cases, the user may desire to switch the remoting session and the streaming session from the user device to another user device. For example, while streaming video content on a laptop computer, the user may submit a request to the remote application system from a mobile device to switch the ongoing remote session and the streaming session to the mobile device. In response to receiving a request to switch a remote session from a first user device to a second user device while a streaming session is ongoing, the system can provide the current session parameters for the session to the second user device. In turn, the second user device can, using the session parameters, submit a request to the different system to establish a new connection with the second user device and to switch the stream of the multimedia content to the new connection between the different system and the second user device. In particular, because the request is accompanied by the necessary parameters, e.g., the session token and the session key for the streaming session, the different system establishes the new connection and switches the stream to the new connection, enabling the user to continue the streaming session from the second user device.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving, at a remote application system, a first user request from a first user device, wherein the request is to access an application that executes on the remote application system;

initiating a remote session with the first user device that allows user interfaces generated by the application executing at the remote application system to be presented on the first user device and user events associated with the presented user interfaces to be provided as input to the application;

as part of the remote session between the first user device and the remote application system:

receiving at the remote application system a request from the first user device to initiate a multimedia streaming session between the first user device and a different system comprising a peer user device using the application executing at the remote application system;

establishing the multimedia streaming session with the peer user device, wherein establishing the multimedia streaming session comprises obtaining session parameters for the multimedia streaming session for the peer user device, wherein the session parameters are obtained by the remote application system from the peer user device and include a network address for the peer user device and negotiated session credentials for the streaming session; and providing, by the remote application system, the session parameters for the peer user device to the first user device for use by the first user device in establishing a connection between the first user device and the peer user device and using the user interface generated by the application executing at the remote application system to stream multimedia content over the connection directly between the first user device and the peer user device without passing the streaming multimedia content through the remote application system;

receiving, by the first user device, the session parameters;

contacting, by the first user device, the peer user device using the network address;

establishing, by the first user device, the connection with the peer user device using the session credentials; and streaming, by the first user device, multimedia content over the established connection with the peer user device.

2. The method of claim 1, wherein the streaming session credentials comprise a session token for session authentication and a session key for session encryption.

3. The method of claim 1, further comprising:

maintaining the remote session while the multimedia content is streamed over the connection between the first user device and the peer user device.

4. The method of claim 3, further comprising:

monitoring the streaming session between the first user device and the peer user device.

5. The method of claim 1, further comprising:

during the remote session with the first user device, receiving a request to switch the multimedia streaming session to a second user device; and providing the streaming session parameters to the second user device.

6. The method of claim 5, further comprising:

receiving, by the second user device, the session parameters;

establishing, by the second user device, a second connection with the peer user device using the session parameters; and streaming, by the second user device, multimedia content over the second connection with the peer user device.

7. The method of claim 1, further comprising:

performing a directory look up to locate the peer user device in response receiving the request.

8. A non-transitory computer storage medium encoded with a computer program, the computer program comprising instructions that when executed by one or more computers cause the one or more computers to perform operations comprising:

receiving, at a remote application system, a first user request from a first user device, wherein the request is to access an application that executes on the remote application system;

initiating a remote session with the first user device that allows user interfaces generated by the application executing at the remote application system to be presented on the first user device and user events associated with the presented user interfaces to be provided as input to the application;

as part of the remote session between the first user device and the remote application system:

receiving at the remote application system a request from the first user device to initiate a multimedia streaming session between the first user device and a different system comprising a peer user device using the application executing at the remote application system;

establishing the multimedia streaming session with the peer user device, wherein establishing the multimedia streaming session comprises obtaining session parameters for the multimedia streaming session for the peer user device, wherein the session parameters are obtained by the remote application system from the peer user device and include a network address for the peer user device and negotiated session credentials for the streaming session; and providing, by the remote application system, the session parameters for the peer user device to the first user device for use by the first user device in establishing a connection between the first user device and the peer user device and using the user interface generated by the application executing at the remote application system to stream multimedia content over the connection directly between the first user device and the peer user device without passing the streaming multimedia content through the remote application system;

receiving, by the first user device, the session parameters;

contacting, by the first user device, the peer user device using the network address;

establishing, by the first user device, the connection with the peer user device using the session credentials; and streaming, by the first user device, multimedia content over the established connection with the peer user device.

9. A system comprising:

a remote application system comprising one or more computers and one or more storage devices storing instructions that when executed by the one or more computers cause the one or more computers to perform operations comprising:

receiving a first user request from a first user device, wherein the request is to access an application that executes on the remote application system;

initiating a remote session with the first user device that allows user interfaces generated by the application to be presented on the first user device and user events associated with the presented user interfaces to be provided as input to the application;

as part of the remote session between the first user device and the remote application system:

receiving a request from the first user device to initiate a multimedia streaming session between the first user device and a different system comprising a peer user device using the application executing at the remote application system;

establishing the multimedia streaming session with the peer user device, wherein establishing the multimedia streaming session comprises obtaining session parameters for the multimedia streaming session for the peer user device, wherein the session parameters are obtained by the remote application system from the peer user device and include a network address for the peer user device and negotiated session credentials for the streaming session; and providing the session parameters for the peer user device to the first user device for use by the first user device in establishing a connection between the first user device and the peer user device and using the user interface generated by the application executing at the remote application system to stream multimedia content over the connection directly between the first user device and the peer user device without passing the streaming multimedia content through the remote application system; and the first user device, wherein the first user device is configured to perform operations comprising:

receiving the session parameters;

contacting the peer user device using the network address;

establishing the connection with the peer user device using the session credentials; and streaming multimedia content over the established connection with the peer user device.

10. The system of claim 9, wherein the streaming session credentials comprise a session token for session authentication and a session key for session encryption.

11. The system of claim 9, the operations further comprising:

maintaining the remote session while the multimedia content is streamed over the connection between the first user device and the peer user device.

12. The system of claim 11, the operations further comprising:

monitoring the streaming session between the first user device and the peer user device.

13. The system of claim 9, the operations further comprising:

during the remote session with the first user device, receiving a request to switch the multimedia streaming session to a second user device; and providing the streaming session parameters to the second user device.

14. The system of claim 13, further comprising:

the second user device, wherein the second user device is configured to perform operations comprising:

receiving the session parameters;
establishing a second connection with the peer user device using the session parameters; and
streaming multimedia content over the second connection with the peer user device.

15. The system of claim 9, the operations further comprising:
performing a directory look up to locate the peer user device in response receiving the request.

* * * * *